United States Patent [19]
McNamara et al.

[11] 3,836,396
[45] Sept. 17, 1974

[54] SUGAR COMPOSITION
[75] Inventors: Thomas F. McNamara, N. Caldwell; Timothy P. Perper, New Brunswick, both of N.J.
[73] Assignee: Warner-Lambert Company, Morris Plains, N.J.
[22] Filed: Apr. 13, 1972
[21] Appl. No.: 243,876

[52] U.S. Cl.................... 127/30, 424/180, 426/213, 426/217
[51] Int. Cl. .............................................. C13f 3/00
[58] Field of Search......... 99/141 R, 134 R; 127/29, 127/30; 424/180; 426/217, 213, 214

[56] References Cited
UNITED STATES PATENTS
2,694,643  11/1954  Robinson et al.................. 99/141 R
3,057,734  10/1962  Pader................................ 99/141 R
FOREIGN PATENTS OR APPLICATIONS
1,965,043  7/1971  Germany

OTHER PUBLICATIONS

Handbook of Chemistry and Physics, 14th Ed., 1959, page 2050.
Barker, Chem. Abst. Vol. 75, 1971, page 101285a.
Guggenheim et al., Chem. Abst. Vol. 66, 1967, page 83567b.
West et al., Textbook of Biochemistry, 4th Ed., 1966, Page 257.
Chemical Abstracts, 75:101285a (1971).

*Primary Examiner*—Morris O. Wolk
*Assistant Examiner*—Sidney Marantz
*Attorney, Agent, or Firm*—Albert H. Graddis; Frank S. Chow; Anne M. Kelly

[57] ABSTRACT

Compositions of sugars suitable as substitutes for table sugar. The compositions, sucrose and fructose; sucrose and maltose; and sucrose, fructose and maltose are less cariogenic than table sugar alone.

6 Claims, No Drawings

SUGAR COMPOSITION

The dental profession and the general public both recognize that persons who eat considerable amounts of table sugars (sucrose) either as such or as a component of some sweet or confection are more likely to develop caries than those whose sugar intake is considerably restricted.

The major reason why sucrose is the universal sweetner though recognized as having certain drawbacks is that there is no substitute for it. Almost every culture which has sugar available to it makes it a significant part of their overall diet. The habit of including sucrose as part of the diet is so ingrained that the general populace prefers to risk carious teeth rather than forego the familiar pleasures derived from including sugar in its diet. The only practical solution to such a dilemma would be to provide a substitute for sucrose which is so like sucrose itself that the users of sucrose would be willing to accept the substitute. This would be particularly so if in addition to having a sameness of taste and other organoleptic properties that it additionally were freer from some of the known drawbacks of sucrose itself.

Synthetic sweeteners such as saccharine and cyclamates have only limited approval by the general public. The major group which uses synthetic sweeteners appears to do so only as a means of filling a therapeutic need.

Previously, diets have been suggested which eliminated sucrose entirely and substituted one or more of the other sugars which are known to exist. A decrease in the incidence and severity of caries in laboratory animals were shown to result from such a switch but the public has never been persuaded to make such a change of its own volition. The reason for this reluctance is believed to be unfamiliarity of the degree of sweetness and other characteristics of the substitute sugars. Fructose, for instance, is 1.6 times as sweet as sucrose. Maltose, on the other hand, is only about .4 times as sweet as sucrose. Sucrose is the standard against which all other degrees of sweetness are measured. The values mentioned above are those determined as the threshold of recognition of sweetness in an aqueous solution.

The panels were tested by a triangular method in which 6 inexperienced panelists were given two solutions of sucrose, fructose, maltose combinations and 1 of sucrose alone. They were then asked to identify the sample that tasted different to them. At a concentration of 3 percent, they were unable to distinguish a difference in solution. At a concentration of 5 percent, no significant ability to distinguish the solutions was evident.

The results would tend to indicate, however, that when the combination of sugars was varied passed a certain range, that the panel members had a general reaction of dislike either because the solution was too bland or too sweet.

The results of the panel testing were varied but showed definite trends. In the case where the sugar compositions were approximately 60 percent sucrose, 20 percent fructose and 20 percent maltose that composition gained the widest acceptance as being sucrose. As the 40 percent of the sugar mixture other than sucrose was made up by more fructose and less maltose, the sweetness increased until with the 40 percent fructose, 60 percent sucrose combination, more panel members felt that it was overly sweet. Reversing the combination in the other direction, by increasing the amount of maltose and decreasing the fructose, that as the 40 percent of other sugars was nearly all maltose, an increasing number of panelists found the sugar compositions to be unsatisfactorily bland.

The ideal combination for the purposes of providing an acceptable substitute for pure sucrose is the sucrose, fructose and maltose combination in a weight ratio of 6:2:2. It is clear, however, that depending upon the particular preference of the individuals, that a reasonable number of people will still accept a sucrose base of 60 parts by weight and various combinations of fructose to maltose making up the other 40 parts by weight up to the point where there is practical limit of 60 percent sucrose, 40 percent fructose on the sweet side, and 60 percent sucrose, 40 percent maltose on the bland side.

It is generally conceded that two major factors are operative in tooth decay. One is the production of closely adherent polysaccharide substance which attaches itself to enamel surfaces of the teeth and which forms a permeable matrix into which the various bacteria penetrate. These, in turn, operate on food debris and the metabolites thereof to develop acid sites which are particularly detrimental to teeth as they are kept in proximity to the enamel surface by the matrix where they can do the most damage and are not readily removed nor counteracted by the protective action of saliva.

The adherent matrix which is usually referred to as plaque, is known to be easily formed as a result of the normal metabolism of sucrose in the mouth. Upon ingestion into the mouth, sucrose is metabolized into equal parts of dextrose, or as it is more commonly called, glucose and fructose. These two compounds in turn are further acted upon to form dextran in the case of dextrose and levan in the case of fructose. The two latter compounds are the major building blocks which form the polysaccharides which are incorporated with other materials into plaque. The plaque quickly becomes permeated with bacteria. This is a situation which is optimum for the development of dental caries.

It has been observed that the substitution of other sugar carbohydrates for sucrose reduces the production of plaque and the development of caries. The reason tooth decay has not been successfully combatted in the past by making such substitutions is two fold. No other sugar is so plentiful as sucrose nor are the organoleptic characteristics of them sufficiently like sucrose to become readily accepted as a substitute for it.

An object of the present invention is providing an acceptable substitute for pure sucrose.

Another object is to provide a blend of carbohydrate sugars having the approximate organoleptic characteristics of pure sucrose.

These and other objects of the present invention will be more fully appreciated upon consideration of the following explanation and the examples which accompany it.

The present invention is based on the discovery that sucrose need not be totally abstained from in order to derive the benefits resulting from complete replacement of sucrose with less cariogenic carbohydrate sugars. A large number of possible substitute carbohydrates were screened and it was determined that fructose and maltose in in vitro experiments both produce considerably less plaque than does like amounts of sucrose under the same conditions. The question then suggested itself as to whether compositions containing sucrose plus maltose and fructose might also reduce the incidence and severity of caries.

The sugar combinations of the present invention are such that in addition to being acceptable substitutes for sucrose alone have an added benefit in that individuals using them may in addition to decreasing their intake of sucrose, reduce plaque formation in the mouth and attendant incidence of caries. These effects have been demonstrated in in vitro and animal testing and indicate that despite the inclusion of a major portion of sucrose in the sugar compositions that its detrimental effects are moderated to a degree greater than would ordinarily be expected.

The switch to the preferred 6:2:2 sucrose/maltose/fructose composition has been shown to result in a definite reduction of both the incidence and severity of caries in laboratory animals. Laboratory test animals such as hamsters are recognized as suitable models in studies of the factors which contribute to the inception of caries and the severity of their development.

A comparative study using randomly selected groups of Golden Syrian hamsters was carried out to determine whether any significant variation in the production of caries could be ascribed to the type of carbohydrates contained in their diets.

The test animals were fed on the cariogenic diet formula No. 2000 as described in Keyes et al in their article "Periodonal Lesions in the Syrian Hamster", Arch. Oral Biol., 9:377, 1964. This cariogenic diet contains, in percent, by weight, sucrose, 56: skim milk 28; whole wheat flour, 6; alfalfa powder, 3; Brewers yeast, 4; liver powder 1; and sodium chloride, 2.

This diet was fed to Group A which had a total of 20 animals to establish a baseline against which to evaluate the other diets. Parallel groups of randomly selected hamsters were fed similar diets except that 56 percent sucrose was substituted for as follows: Twenty animals in Group B were given a mixture of 42 percent sucrose, 14 percent fructose; Twenty animals in Group C were given 42 percent sucrose, 14 percent maltose; and 25 animals in Group D were given a preferred composition of 33.6 percent sucrose, 11.2 percent fructose and 11.2 percent maltose. It can be appreciated that the only variable in the diet was the combination of carbohydrates that in each instance was 56 percent of the total diet. The hamsters were kept on this regimen for a period of 90 days, at the end of which they were sacrificed and their teeth examined and scored according to the method Keyes has set forth in Dental Progress, Volume 2, pages 46–51, October 1961 in the article "A New Method for Assessing Caries Inhibiting Agents". The teeth also were checked as to the simple incidence of caries.

The following tables summarize the results of animal studies comparing a standard cariogenic diet with the diet of the present invention which differed only in the replacement of 40 percent of the sucrose with equal parts of fructose and maltose.

Observational bias was minimized by having the estimates of caries severity made by the same investigator.

Table I summarizes the combined measure of incidence and severity of caries in accordance with the method of Keyes.

TABLE I

Reductions in Caries Produced by Sucrose, Fructose and Maltose Diets in Hamsters

| Experiment | | Diet | Number of Animals | Average Caries Score* | Difference in Caries Severity Compared to Control | Probability That Difference is Due to Chance** |
|---|---|---|---|---|---|---|
| 1. | A: | 56% Sucrose (Control) | 10 | 40.3 ± 9.0 | — | — |
| | B: | 42% Sucrose +14% Fructose | 10 | 10.9 ± 2.4 | 29.4 (−73%) | <0.01 |
| | C: | 42% Sucrose +14% Maltose | 10 | 9.5 ± 2.1 | 30.8 (−76%) | <0.01 |
| | D: | 33.6% Sucrose +11.2% Fructose +11.2% Maltose | 13 | 10.2 ± 4.5 | 30.1 (−75%) | <0.01 |
| 2. | A: | 56% Sucrose (Control) | 10 | 45.9 ± 9.6 | — | — |
| | B: | 42% Sucrose +14% Fructose | 10 | 29.8 ± 9.1 | 16.1 (−35%) | 0.05 |
| | C: | 42% Sucrose +14% Maltose | 10 | 32.4 ± 8.1 | 13.5 (−29%) | 0.63 |
| | D: | 33.6% Sucrose +11.2% Fructose +11.2% Maltose | 12 | 24.9 ± 8.3 | 21.0 (−46%) | 0.08 |

*Average caries scores were determined by the same investigator in both experiments. They are shown with the associates standard error of the mean.
**Significance computed using standard t-test.

Table II summarizes the incidence of caries in animals on the cariogenic diet and on the diet modified in accordance with the present invention only with respect to the sugar component.

TABLE II

Reductions in Numbers of Carious Teeth Produced by Sucrose, Fructose & Maltose Diets

| Experiment | Diet | Number of Animals | Average Number Carious Teeth Per Hamster | Difference in Carious Teeth, Compared To Control | Probability That Difference Is Due To Chance* |
|---|---|---|---|---|---|
| 1. A: | 56% Sucrose (Control) | 10 | 8.80 | — | — |
| B: | 42% Sucrose +14% Fructose | 10 | 5.20 | 3.6 (−41%) | 0.0006 |
| C: | 42% Sucrose +14% Maltose | 10 | 5.20 | 3.6 (−41%) | 0.0006 |
| D: | +33.6% Sucrose +11.2% Fructose +11.2% Maltose | 13 | 3.00 | 5.8 (−66%) | $<10^{-4}$ |
| 2. A: | 56% Sucrose (Control) | 10 | 9.50 | — | — |
| B: | 42% Sucrose +14% Fructose | 10 | 6.00 | 3.5 (−37%) | 0.0008 |
| C: | 42% Sucrose +14% Maltose | 10 | 6.70 | 2.8 (−29%) | 0.0076 |
| D: | 33.6% Sucrose +11.2% Fructose +11.2% Maltose | 12 | 5.70 | 3.8 (−40%) | 0.0002 |

*Significance by standard t-test

It is clear from the data of the two foregoing tables that the combinations of sugars of the present invention have not only reduced the incidence of caries but also have reduced the severity of the caries attack, and therefore tend to be less cariogenic than sucrose alone.

What is claimed is:

1. A sugar composition having reduced cariogenicity but being substantially equivalent in sweetness to sucrose consisting essentially of 60 percent by weight sucrose, and a total of 40 percent by weight of a sugar selected from the group consisting of fructose, maltose and mixtures of fructose and maltose, said composition containing no dextranase.

2. A sugar composition as set forth in claim 1 wherein there is 10 to 30 percent fructose and 10 to 30 percent maltose.

3. A sugar composition as set forth in claim 1 wherein there is 20 percent fructose and 20 percent maltose.

4. A process for reducing the cariogenicity of sucrose while maintaining substantially equivalent sweetness which comprises the addition thereto of about 40 percent by weight, of at least one sugar selected from the group consisting of 0 to 40 percent fructose and 0 to 40 percent maltose.

5. A process according to claim 4 wherein there is added about 10 to about 30 percent fructose and about 10 to 30 percent maltose.

6. A process according to claim 4 wherein there is added about 20 percent fructose and about 20 percent maltose.

* * * * *